United States Patent [19]

Matsumura et al.

[11] Patent Number: 4,926,311
[45] Date of Patent: May 15, 1990

[54] PART PROFILE INPUT METHOD

[75] Inventors: Teruyuki Matsumura; Noritake Nagashima, both of Tokyo, Japan

[73] Assignee: Fanuc Ltd., Minamitsuru, Japan

[21] Appl. No.: 265,799

[22] PCT Filed: Feb. 17, 1988

[86] PCT No.: PCT/JP88/00158
§ 371 Date: Oct. 18, 1988
§ 102(e) Date: Oct. 18, 1988

[87] PCT Pub. No.: WO88/06311
PCT Pub. Date: Aug. 25, 1988

[30] Foreign Application Priority Data

Feb. 20, 1987 [JP] Japan .................................. 62-37277

[51] Int. Cl.⁵ .............................................. G05B 19/18
[52] U.S. Cl. ............................ 364/191; 364/474.27; 364/474.22
[58] Field of Search ...................... 364/474.22, 474.24, 364/474.27, 474.29, 191

[56] References Cited

U.S. PATENT DOCUMENTS 3,866,179 2/1975 McGee et al. ................. 364/474.18

Primary Examiner—Jerry Smith
Assistant Examiner—Paul Gordon
Attorney, Agent, or Firm—Staas & Halsey

[57] ABSTRACT

A part profile input method for automatically creating NC data. The method includes conversationally inputting a part profile without giving any consideration to chamfering or rounding of corner portions of the part. At the end of part profile definition, a conversational display for inputting a corner shape is presented, computing the angle made by intersection of mutually adjacent profile elements and determining the position of an intersection to be regarded as an outside corner or inside corner by comparing each angle of intersection with a set angle. Under these conditions, when it is specified (i) whether the shapes of all corner portions (inclusive of outside and inside corners), the shapes of all outside corner portions or the shapes of all inside corner portions are to be defined collectively, and (ii) whether the shapes are rounded or chamfered shapes, the part profile is input by inserting the specified rounded shapes or chamfered shapes, which are in the form of preset dimensions, at the specified corners (all corner portions, all outside corner portions, all inside corner portions).

4 Claims, 9 Drawing Sheets

PART PROFILE INPUT METHOD

BACKGROUND OF THE INVENTION

This invention relates to a part profile input method. More particularly, the present invention is directed to a part profile input method in an NC data creating apparatus in which a part profile is specified by inputting profile elements of a part using arrow keys and NC data are created to perform machining in accordance with the specified part profile.

An automatic programming system is available in which a conversational display and a function key (soft key) display are each presented in accordance with each step of a plurality of data input steps. A function key (soft key) conforming to a prescribed function and appearing on the function key display is pressed to thereby execute processing corresponding to the function. An NC program is prepared using data input while referring to the conversational display.

An automatic programming system of this kind, which will be described with reference to FIG. 6, successively displays predetermined prompt images (the conversational display) on a display screen in accordance with the following steps:

(1) a first step of selecting execution of "AUTOMATIC PROGRAMMING";
(2) a second step of selecting data to be input, or in other words, a data input step to be executed next;
(3) a third step of selecting the material of a blank;
(4) a fourth step of setting surface roughness;
(5) a fifth step of selecting a drawing format;
(6) a sixth step of inputting the blank profile and the dimensions thereof;
(7) a seventh step of inputting a part profile and the dimensions thereof;
(8) an eighth step of inputting the machining reference point and turret position;
(9) a ninth step of selecting a machining process;
(10) a tenth step of selecting a tool and inputting tool data;
(11) an eleventh step of deciding machining conditions;
(12) a twelfth step of inputting cutting direction;
(13) a thirteenth step of inputting cutting limits;
(14) a fourteenth step of inputting whether or not an area is to be cut by the same tool; and
(15) a fifteenth step of computing a tool path (i.e. of preparing NC data).

An operator responds to these prompts by entering the necessary data from a keyboard. Finally, an NC program (NC data) is created using all of the entered data.

In the part profile input step (the seventh step) performed by the NC data creating apparatus, a prompt (ES =) calling for a part profile element is displayed on the display screen, as shown in FIG. 7. In response to this prompt, arrow keys ( ↑ , → , ↓ , ← , ╱ , ╱ , ╲ , ╲ , ), ⊂ , ), a thread-cutting key, a chamfering key (C key), a rounding key (R key), a grooving key (G key) and a corner-removal key, which are provided on a keyboard, are operated in accordance with the part profile while a design drawing is observed. The part profile is thus input. Whenever a single part profile element is input using an arrow key, a prompt calling for the dimensions of this element is displayed. In resposne to this prompt, dimensions taken from the design drawing are input, whereupon profile element symbols PFS and graphic images PFG of these profile elements appear on the display screen.

For example, when linear elements are input by pressing the arrow keys indicated by ↑ , → , ↓ , ← , ╱ , ╱ , ╲ , ╲ , prompts appear calling for the X coordinate ($X_E$) of the end point of the straight line, the Z coordinate ($Z_E$) of this end point, whether or not this straight line contacts the preceding profile element or the next profile element, the angle (A) which the straight linen forms with the Z axis, etc. The dimensions written on the drawing are entered in response to these prompts. However, when the prescribed dimensions are not written on the drawing (as in the case of the angle formed with the Z axis, for example), this input is not required.

When a circular arc is input by pressing the arrow keys indicated by ⌒ and ⌒ , prompts appear calling for the X and Z coordinates ($X_E$, $Z_E$) of the end point of the circular arc, the X and Z coordinates ($X_C$, $Z_C$) of the center of the circular arc, the radius R of the circular arc, and whether the arc contacts the preceding profile element or the next profile element. The dimensions written on the drawing are input in response to these prompts.

When chamfering is input by the C key, a prompt calling for the amount of chamfering appears. When rounding is input by the R key, a prompt inquiring about the radius of rounding is displayed. In response, the dimensions are entered in a similar fashion.

When all the profile elements are input, all of the profile element symbols PFS of the part profile of the overall part profile figure PFG are displayed on the display screen.

During a machining operation such as turning, there are cases where all corner portions C1 ~ C5 are provided with a prescribed chamfer or roundness, as shown in FIG. 8(a), or where all the outside corner portions (projecting corners) K1 ~ K3 among the corner portions are provided with a prescribed chamfer or roundness, as shown in FIG. 8(b), or where all inside corner portions S1 ~ S2 are provided with a prescribed chamfer or roundness, as shown in FIG. 8(c). In accordance with the conventional method, chamfering or rounding is designated by pressing the C key or R key each time at every corner portion even in the cases just described. As a result, the operation for inputting the part profile is a troublesome one.

Accordingly, an object of the present invention is to provide a part profile input method in which operability for a part profile inpput is enhanced by designating rounding or chamfering at outside and inside corners in a simple manner.

SUMMARY OF THE INVENTION

A part profile is input conversationally without giving any consideration to chamfering or rounding of corner portions of the part. At the end of part profile definition, a conversational display for inputting a corner shape is presented, the angle made by intersections of mutually adjacent profile elements is computed, and the position of an intersection to be regarded as an outside corner or inside corner is determined by comparing each angle of intersection with a set angle. Under these conditions, when it is specified (i) whether the shapes of all corner portions (inclusive of outside and inside corners), the shapes of all outside corner portions or the shapes of all inside corner portions are to be defined collectively, and (ii) whether the shapes are rounded or chamfered shapes, the part profile is input by inserting the specified rounded shapes or chamfered shapes, which are in the form of preset dimensions, at the specified corners (all corner portions, all outside corner portions, all inside corner portions).

BRIEF DESCRIPTION OF THE DRAWINGS

FIGS. 3 and 4 are examples of conversational displays, in which FIG. 3 is a display for inputting corner shapes collectively and FIG. 4 is a display for inputting outside corner shapes in succession;

DESCRIPTION OF THE PREFERRED EMBODIMENTS

Figure 1:
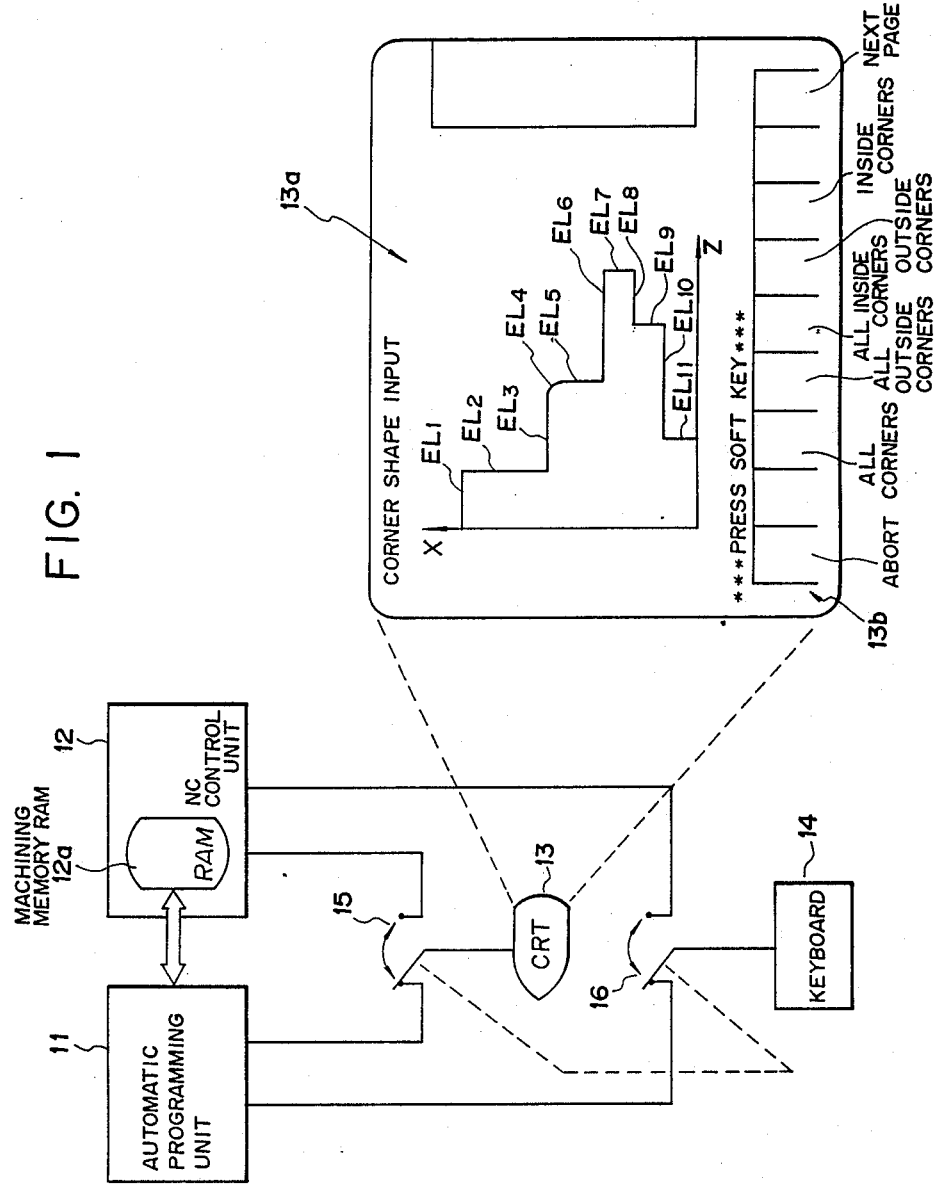
FIG. 1 is a block diagram of an NC apparatus having an automatic programming function for realizing the method of the present invention.
Figure 2:
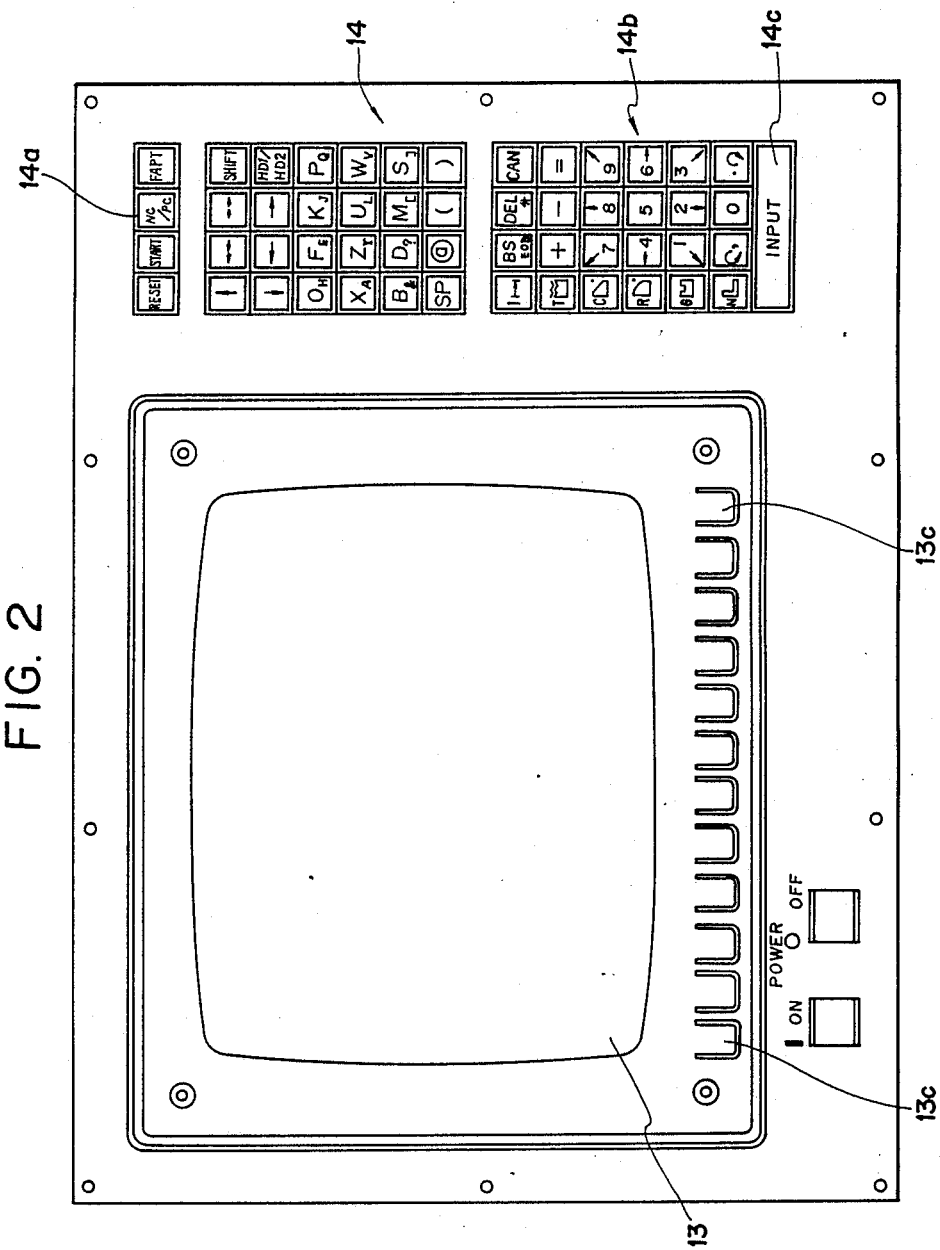
FIG. 2 is an external view of a CRT/MDI unit in the NC apparatus.
Figure 3:
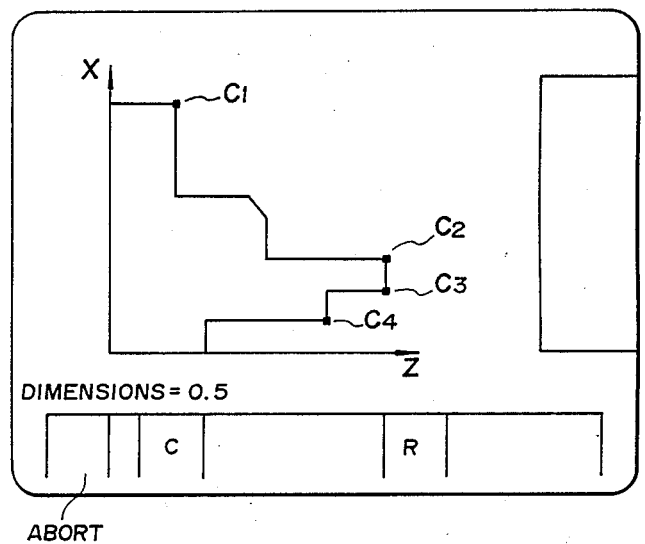
Figure 4:
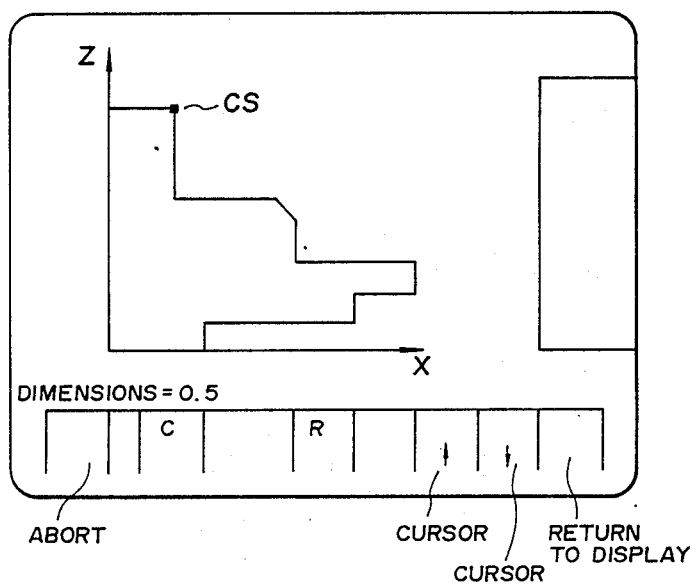

FIG. 1 is a block diagram of an NC apparatus having an automatic programming function for realizing the method of the present invention. FIG. 2 is an external view of a CRT/MDI unit. FIGS. 3 and 4 are examples of conversational displays for inputting corner shapes, and FIG. 5 is a flowchart for processing according to the present invention.

In FIG. 1, numeral 11 denotes an automatic programming unit, 12 an NC control unit, 13 a graphic display unit (CRT), 14 a keyboard, and 15 and 16 are changeover units. The changeover units 15 and 16 are illustrated as being switches for the sake of the description. In actuality, however, changeover is effected by software processing.

The automatic programming unit 11 and NC control unit 12 are of microcomputer construction and incorporate an internal processor, a control program memory (ROM) and a RAM.

The graphic display unit 13 and keyboard 14 are integrated into a single unit, as shown in FIG. 2, which is usually referred to as a CRT/MDI unit. As shown in FIG. 1, the display screen is divided into a conversational display area 13a and a soft key area 13b. Keys 13c (see FIG. 2) ... are provided to correspond to the soft key area. Pressing one of the keys enables the corresponding function displayed in the soft key area to be input. The keyboard 14 has an NC mode/automatic programming mode selection key 14a and a key group 14b, which includes keys serving as both arrow and numeric keys as well as the C key and R key.

Figure 5A:
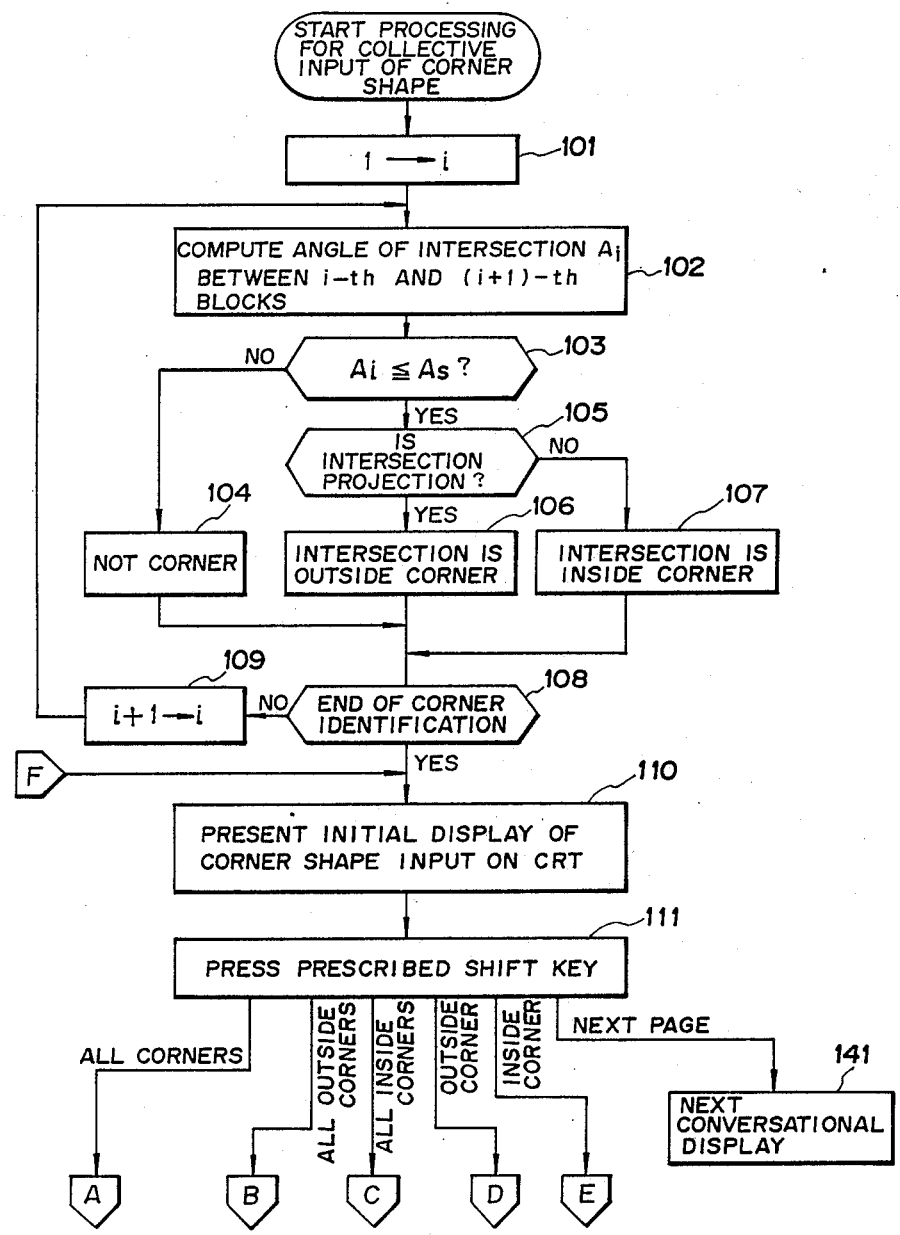
FIGS. 5(a)-5(c) are flowcharts of the processing according to the present invention.
Figure 5B:
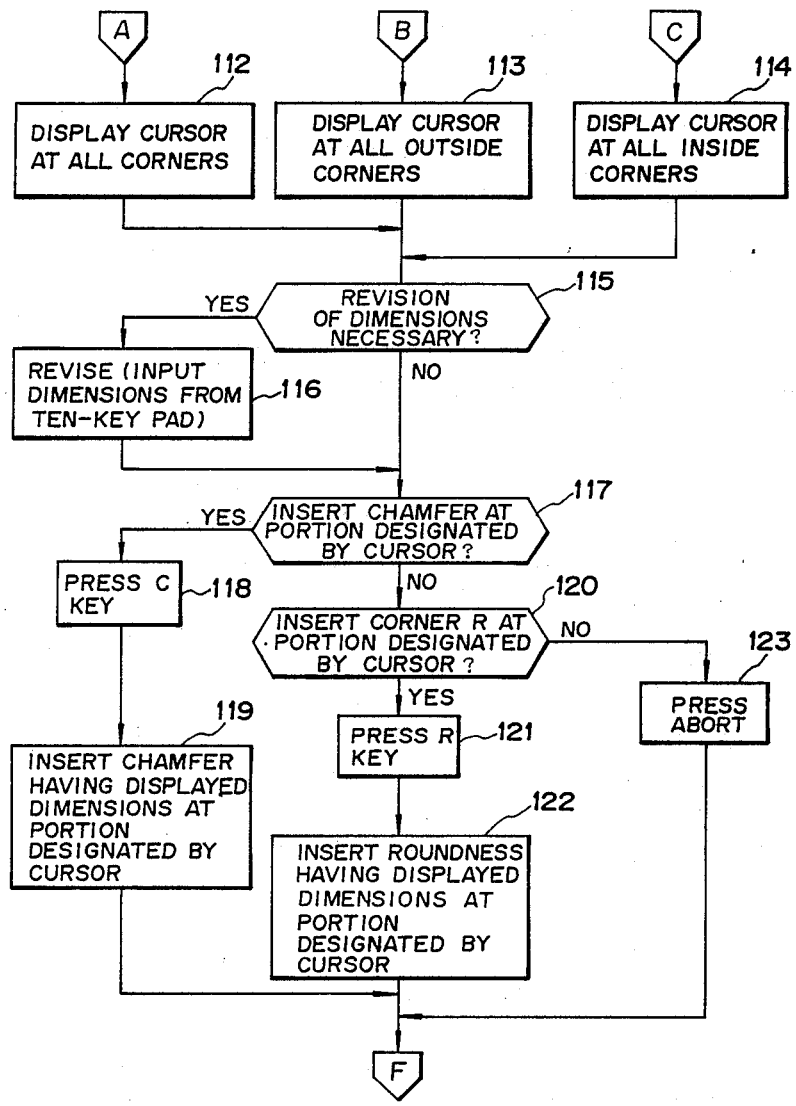
Figure 5C:
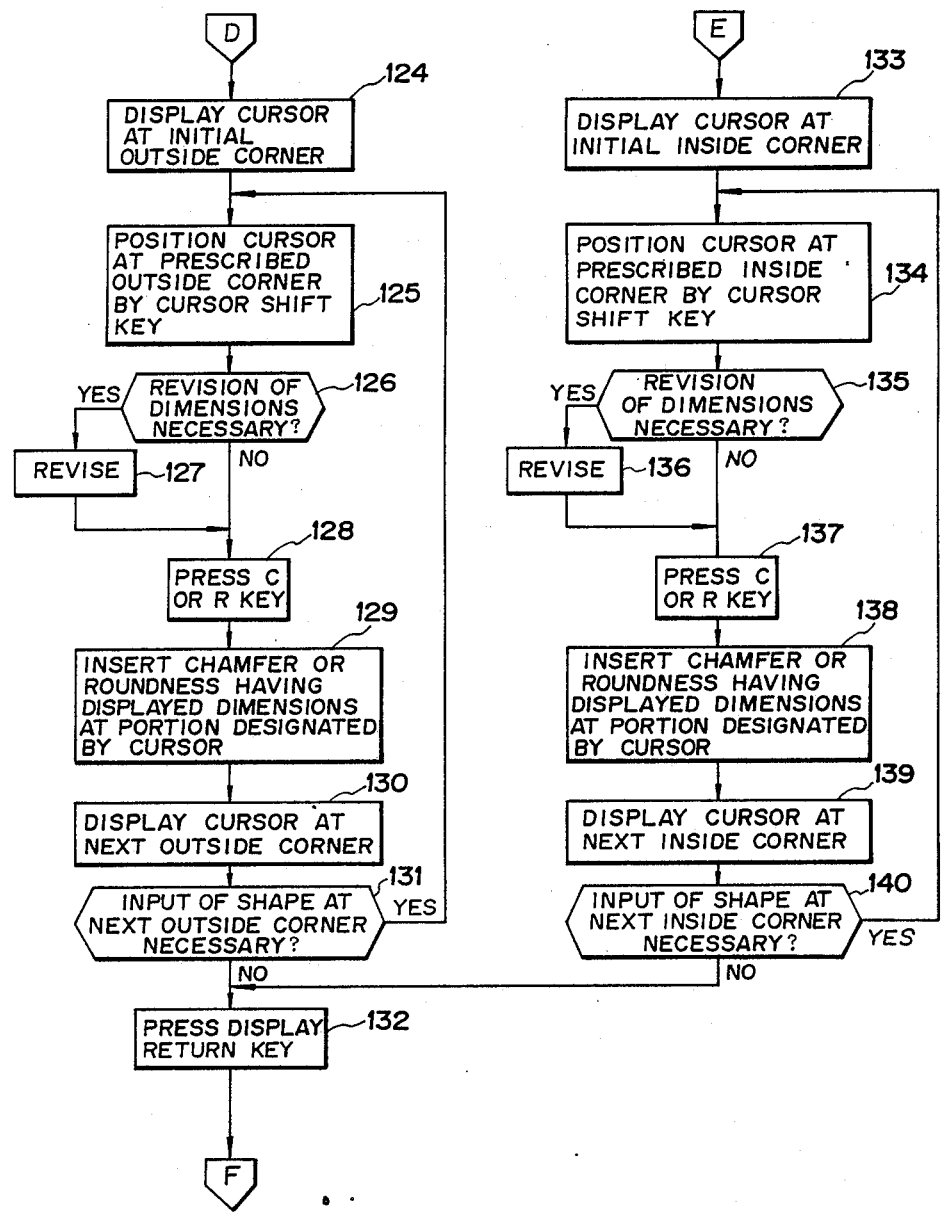

Part profile input processing according to the invention will now be described in accordance with the flowcharts of FIGS. 5(a)-5(c) while referring to FIGS. 1 through 4. It will be assumed that the dimensions of chamfer and roundness to be inserted at a corner portion and an angle $A_s$ regarded as a corner (a portion at which an angle $A_i$ defined by mutually adjacent blocks is less than $A_s$ is regarded to be a corner) have been preset in the RAM of the automatic programming unit 11 in the form of parameters.

Figure 6:
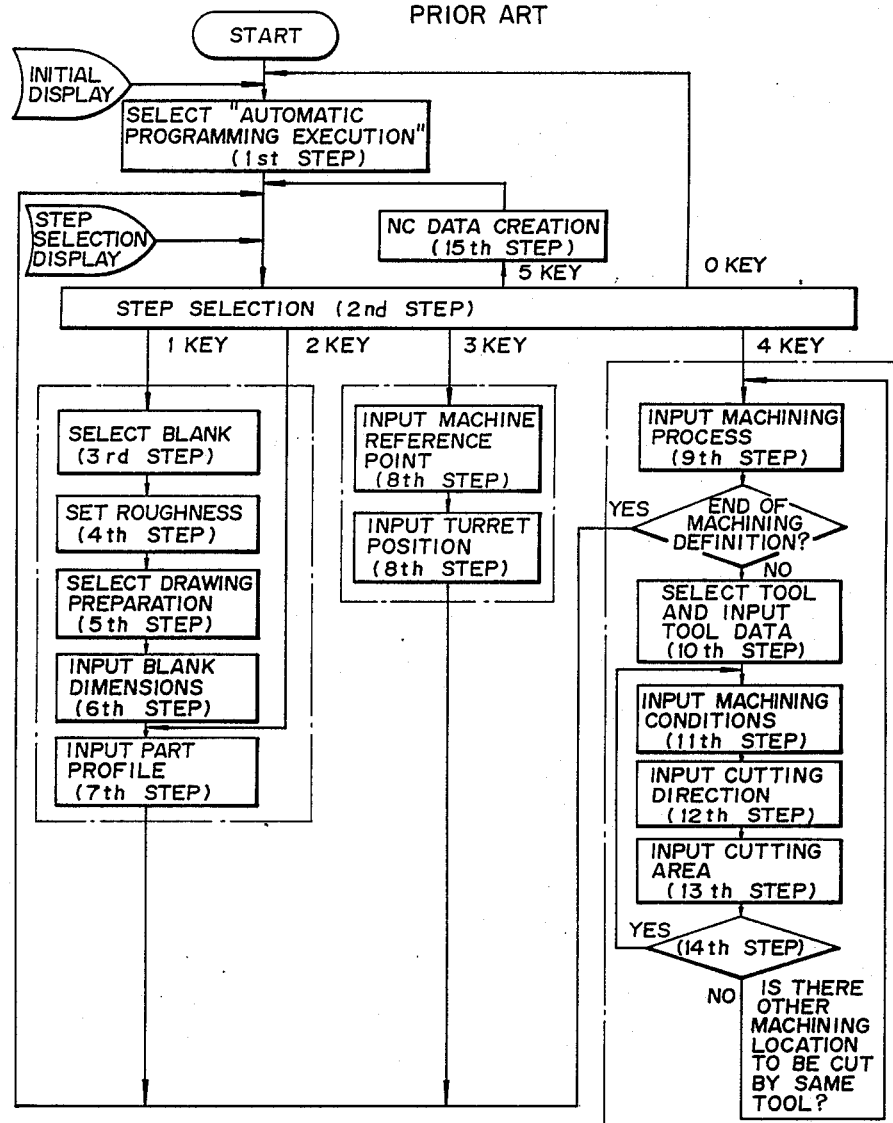
FIG. 6 is a flow chart for performing a prior art part profile.
Figure 7:
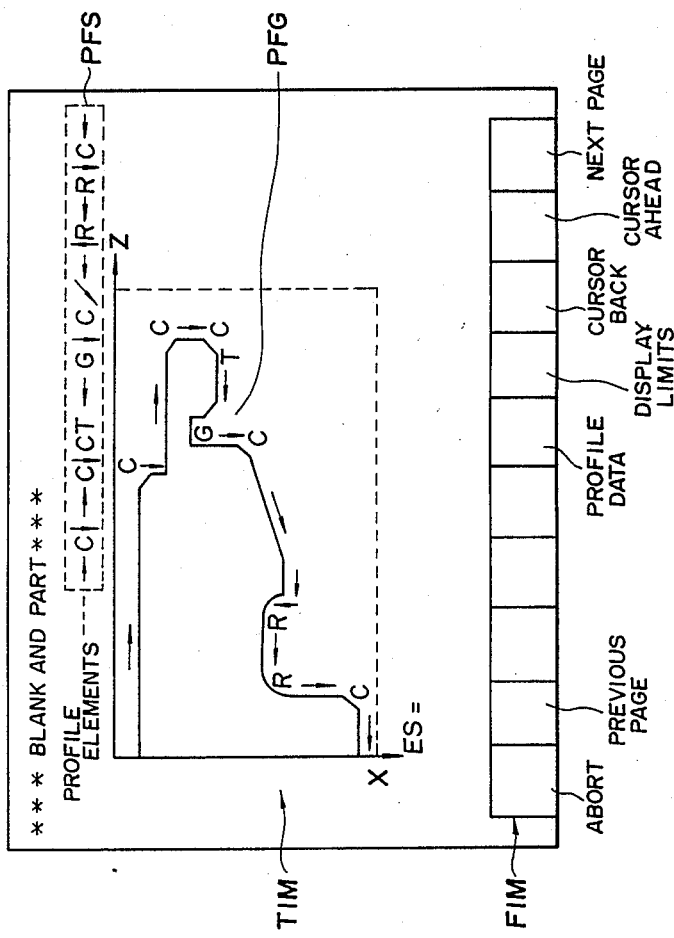
FIG. 7 is a diagram of a prior art part profile.
Figure 8A:
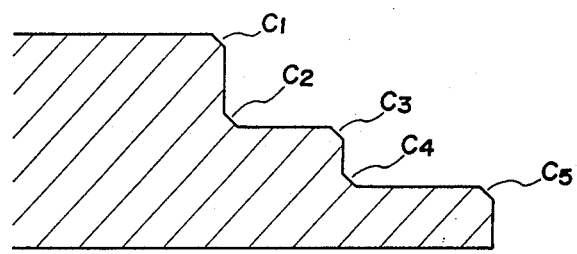
FIGS. 8(a)-8(c) are diagrams for describing the drawbacks of the prior-art method.
Figure 8B:
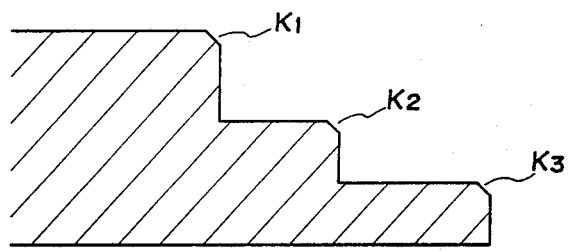
Figure 8C:
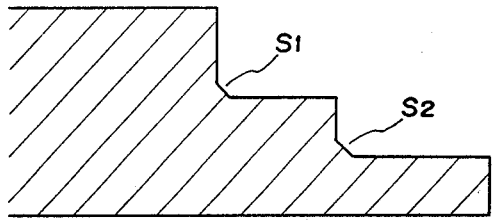

Operating the key 14a (FIG. 2) on the keyboard 14 causes the changeover units 15 and 16 to devote the graphic display unit 13 and keyboard 14 to the automatic programming unit 11. Thereafter, in accordance with the programming function of the automatic programming unit 11, processing up to the seventh step is executed conversationally in a manner similar to the flow of the conventional method shown in FIG. 6, thereby inputting a part profile which does not take the chamfered and rounded shapes of corner portions into consideration. If a soft key "NEXT PAGE" (see FIG. 1) is pressed in the seventh step, a corner shape input processing routine is started and the processor of the automatic programming unit 11 performs the operation $1 \to i$ (step 101).

The processor subsequently computes an intersection angle $A_i$ made by profile elements $EL_i$, $EL_{i+1}$ of i-th and (i+1)-th blocks, respectively (step 102). In the case of a projecting corner (namely a corner forming a projection), $A_i$ represents the angle on the inner side of the corner. In the case of a recessed corner (namely a corner forming a cavity), $A_i$ represents the angle which is not on the inner side of the corner.

Next, the angle $A_i$ and a present angle $A_s$ are compared in terms of magnitude (step 103). If $A_i > A_s$ holds, the intersection between the i-th block and (i+1)-th block is not regardd to be a corner (step 104. If $A_i \leq A_s$ holds, it is determined whether the intersection defines a projection or cavity (step 105). If the intersection defines a projection, it is regarded to be a corner as well as an outside corner (step 106). If the intersection defines a cavity, it is regarded to be a corner as well as an inside corner (step 107).

It is checked to see whether the above-described corner identification processing has ended for all intersections (step 108). If the corner identification processing has not ended, the operation $i+1 \to i$ is performed (step 109) and processing from step 102 onward is repeated.

If corner identification processing for all corners has ended, however, the processor of the automatic programming unit 11 causes an initial display 13a for corner shape input and the soft key display 13b to be presented on the display unit 13 (step 110), as shown in FIG. 1. It should be noted that the corner identification processing can be carried out after the initial display 13a is presented.

If it is desired to chamfer or round ball of the corner portions, the operator presses a soft key "ALL CORNERS". A soft key "ALL OUTSIDE CORNERS" is pressed if it is desired to chamfer or round all outside corners. A soft key "ALL INSIDE CORNERS" is pressed if it is desired to chamfer or round all inside corners. A soft key "OUTSIDE CORNER" is pressed if it is desired to chamfer or round outside corners one at a time. A soft key "INSIDE CORNER" is pressed if it is desired to chamfer or round inside corners one at a time (step 111).

If the soft key "ALL CORNERS" is pressed, the processor causes a display for collective input of corner shapes, in which cursors $C1 \sim C4$ are displayed at all of the corners, to be presented (step 112), as shown in FIG. 3. If the soft key "ALL OUTSIDE CORNERS" is pressed, the processor causes a display for collective input of outside corner shapes, in which cursors are displayed at all of the outside corners, to be presented (step 113). If the soft key "ALL INSIDE CORNERS" is pressed, the processor causes a display for collective input of inside corner shapes, in which cursors are displayed at all of the inside corners, to be presented (step 114).

Since the dimensions of the chamfered or rounded shape (i.e., radius if roundness is to be inserted and the amount of chamfering if a chamfer is to be inserted) appear on the display for collective input of corner shape, the operator judges whether or not these dimensions are suitable (step 115). If it is desired to revise the dimensions, then revised dimensions are input from the keyboard 14 (step 116). The revised dimensions are displayed in place of the old.

Thereafter, if chamfers are to be inserted at the intersections indicated by the cursors, the operator presses the soft key "C". In response, the processor inserts the chamfered shape having the displayed dimensions at the corner portions designated by the cursors (steps 117–119).

If roundness (corner R) is to be inserted at the portions designated by the cursors, the operator presses the soft key "R". In response, the processor inserts roundness having the displayed radius at the corner portions designated by the cursors (steps 120–122).

If it is unnecessary to collectively input a chamfer or roundness, the soft key "ABORT" is pressed (step 123).

If the predetermined shapes are input at all corner portions, all outside corner portions or all inside corner portions through the foregoing operation, processing is then repeated from step 110 onward.

If the soft key "OUTSIDE CORNER" is pressed at the step 111, the processor presents a display for successive input of outside corner shapes, in which a cursor CS is displayed at an initial outside corner (step 124), as shown in FIG. 4.

Thereafter, the operator presses a cursor shift soft key "CURSOR ↑" or "CURSOR ↓" to position the cursor at the desired outside corner (step 125). It should be noted that the cursor is positioned at the immediately preceding outside corner each time the soft key "CURSOR ↑" is pressed and at the immediately following outside corner each time the soft key "CURSOR ↓" is pressed.

Since the dimensions of chamfering or rounding appear on the display for successive input of outside corner shape, the operator judges whether these dimensions are suitable or not (step 126). It is is desired to revise the dimensions, then revised dimensions are inputted from the keyboard 14 (step 127). The revised dimensions are displayed in place of the old.

If the soft key "C" or "R" is subsequently pressed (step 128), the processor inserts the chamfered shape or rounded shape having the displayed dimensions at the outside corner portion designated by the cursor (step 129) and the cursor CS is situated at the next outside corner (step 130).

The operator decides whether it is necessary to insert a shape at another outside corner by the display for successive input of outside corner shapes. If this is necessary, then processing from the step 125 onward is repeated (step 131). If input is unnecessary, a soft key "RETURN TO DISPLAY" is pressed (step 132) and processing from the step 110 onward is subsequently repeated.

If the soft key "INSIDE CORNER" is pressed at the step 111, the processor presents a display for successive input of inside corner shapes, in which a cursor is displayed at an initial inside corner (step 133)

Thereafter, the operator presses a cursor shift soft key "CURSOR ↑" or "CURSOR ↓" to position the cursor at the desired inside corner (step 134).

Since the dimensions of chamfering or rounding appear on the display for successive input of inside corner shape, the operator judges whether these dimensions are suitable or not (step 135). If it is desired to revise the dimensions, then revised dimensions are input from the keyboard 14 (step 136).

If the soft key "C" or "R" is subsequently pressed (step 137), the processor inserts the chamfered shape or rounded shape having the displayed dimensions at the inside corner portion designated by the cursor (step 138) and the cursor is situated at the next inside corner (step 139).

The operator decides whether it is necessary to insert a shape at another inside corner by the display for successive input of inside corner shapes. If this is necessary, then processing from the step 134 onward is repeated (step 140). If input is unnecessary, the soft key "RETURN TO DISPLAY" is pressed (step 132) and processing from the step 110 onward is subsequently repeated.

When input of all corner shapes ends, the soft key "NEXT PAGE" on the initial display (FIG. 1) is pressed to display the next conversational page (step 141) and automatic programming processing is subsequently continued.

In accordance with the present invention, the arrangement is such that a part profile is input without considering the chamfered shape or rounded shape of corner portions, after which the chamfered shapes or rounded shapes of all corner portions, all outside corner portions or all inside corner portions are defined collectively. As a result, the rounding or chamfering of corners can be designated in a simple manner to make the part profile input operation easier.

We claim:

1. A part profile input method for an NC data creating apparatus in which a part profile is defined by inputting profile elements of a part using arrow keys and creating NC data for performing machining in accordance with the defined part profile, said method comprising the steps of:
   (a) displaying, by the NC data apparatus, a conversational display for input of a corner shape on a screen of a display unit when a part profile definition is terminated;
   (b) determining positions of all intersections to be regarded as corners by comparing angles of intersection between two mutually adjacent profile elements with a set angle;
   (c) determining positions of all intersections to be regarded as outside corners or inside corners by discriminating whether the corner defines a projection or a cavity;
   (d) specifying whether shapes of all outside corner portions or inside corner portions or shapes of all corner portions including all inside and outside corner portions are to be defined collectively and whether the shapes are rounded or chamfered shapes; and
   (e) defining the part profile by inserting the specified rounded shapes or chamfered shapes, being in the form of preset dimensions, at respective ones of all the specified outside corner portions or all the specified inside corner portions, or all the specified corner portions.

2. A part profile input method according to claim 1, wherein said step (d) includes specifying shapes of all outside corner portions or shapes of all inside corner portions or shapes of all corner parts including all of the outside and inside corner portions by designating soft key images for specifying shapes of all outside corner portions or shapes of all inside corner portions or shapes of all corner portions in the conversational display.

3. A part profile inpput method according to claim 2, wherein said step (d) further includes designating the positions of all intersections of the specified corner portions by using cursors and displaying preset shape dimensions.

4. A part profile input method according to claim 3, wherein said step (d) includes changing shape dimensions.

* * * * *